(12) United States Patent
Cortes Rico et al.

(10) Patent No.: US 8,717,743 B2
(45) Date of Patent: May 6, 2014

(54) BASEPAN ASSEMBLY FOR AN ELECTRICAL ENCLOSURE

(75) Inventors: Gustavo Cortes Rico, Duluth, GA (US); Brian J. Rusch, Suwanee, GA (US); Carey D. Harnois, Grayson, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 271 days.

(21) Appl. No.: 13/429,540

(22) Filed: Mar. 26, 2012

(65) Prior Publication Data

US 2013/0250488 A1 Sep. 26, 2013

(51) Int. Cl.
*H02B 1/20* (2006.01)
*H02B 1/056* (2006.01)
*H02B 1/26* (2006.01)

(52) U.S. Cl.
USPC ........... 361/637; 361/633; 361/638; 361/639; 361/641; 361/644; 361/652; 361/658

(58) Field of Classification Search
None
See application file for complete search history.

(56) References Cited

U.S. PATENT DOCUMENTS

| | | | | |
|---|---|---|---|---|
| 5,775,942 A | * | 7/1998 | Jeffcoat | 439/517 |
| 6,420,655 B1 | * | 7/2002 | Yang et al. | 174/70 B |
| 7,347,722 B2 | * | 3/2008 | Zhang et al. | 439/517 |
| 7,479,029 B2 | * | 1/2009 | Cook et al. | 439/517 |
| 8,027,154 B2 | * | 9/2011 | Gatti et al. | 361/645 |
| 8,602,814 B2 | * | 12/2013 | Packard et al. | 439/517 |

* cited by examiner

*Primary Examiner* — Boris Chervinsky

(57) ABSTRACT

A base pan assembly for connecting to conductors and an electrical device. The base pan assembly includes a base pan element having walls for isolating each conductor. The base pan assembly also includes a stab element associated with each conductor wherein the stab element includes first and second portions formed in a substantially L shaped configuration. The first portion is adapted to be connected to the electrical device and the second portion is fastened to the base pan element. An end of the second portion is positioned between a pair of ribs. A fastening element is associated with each stab element, wherein the fastening element includes a post extending from the base pan element which is received by an aperture in the second portion. Further, the base pan assembly includes a lug associated with each conductor, wherein the lug receives the second portion and the associated conductor.

20 Claims, 4 Drawing Sheets

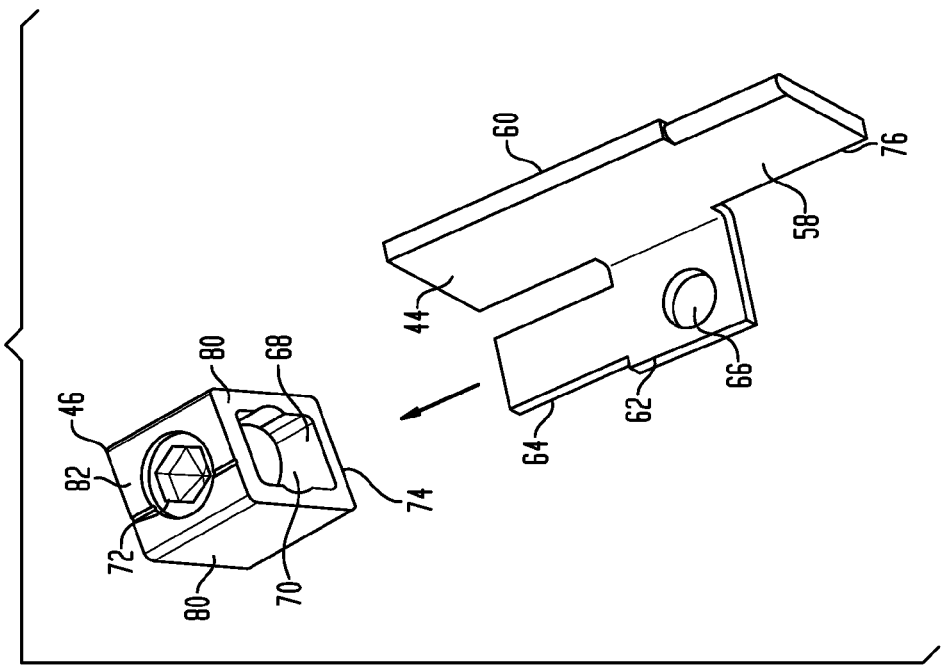
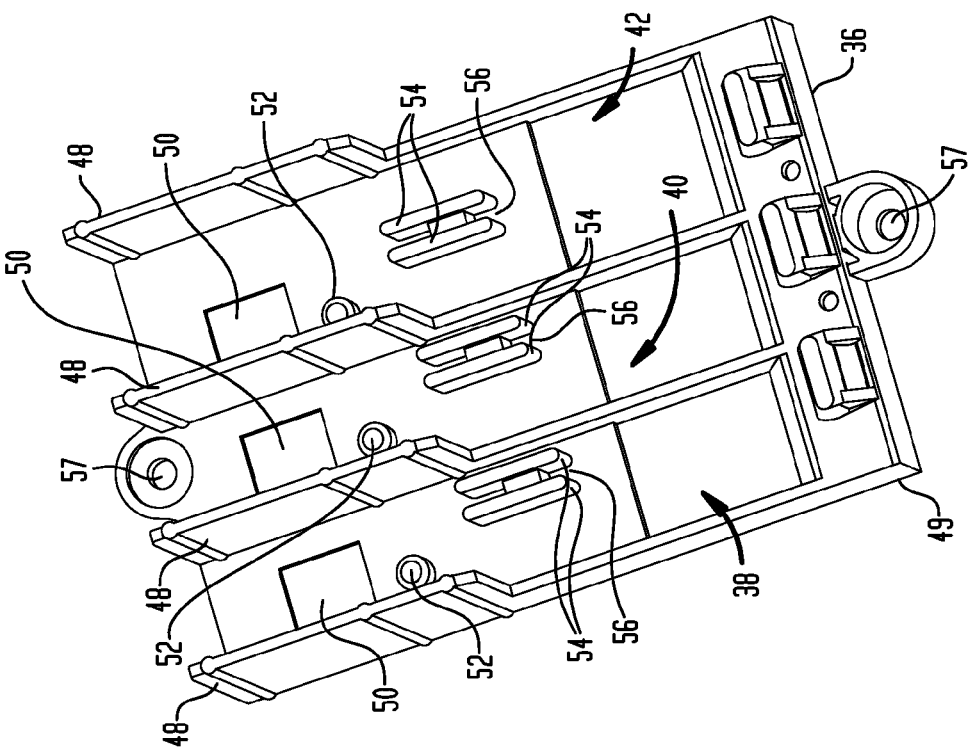

BASEPAN ASSEMBLY FOR AN ELECTRICAL ENCLOSURE

FIELD OF THE INVENTION

This invention relates to a base pan assembly for use in an electrical enclosure, and more particularly, to a base pan assembly for connecting to a conductor and an electrical device such as a circuit breaker.

BACKGROUND OF THE INVENTION

Electrical power enters a building, such as a residence, through a metering device. The metering device is used to determine how much electricity has been consumed in the building for billing purposes, for example. The metering device includes a meter, such as watt-hour meter, having outwardly extending stabs that are removably connected to a meter socket having slots for receiving the stabs. The meter socket is connected to a main circuit breaker via conductors and a base pan assembly. The main circuit breaker serves to connect or disconnect electrical power to the building. The metering device, meter socket, base pan assembly and main circuit breaker are attached to an enclosure.

The meter socket and the base pan are typically connected by three conductors (i.e. two live or hot conductors and a neutral conductor) which are electrically isolated from each other. Further, the base pan includes stabs that connect to the main circuit breaker which also must be isolated. Several assemblies and components are needed to connect the conductors to the base pan and to isolate the conductors and stabs. However, such assemblies and components are relatively complex to manufacture and assemble, thus increasing costs.

SUMMARY OF THE INVENTION

A base pan assembly for connecting to a conductor and an electrical device is disclosed. The base pan assembly includes a base pan element having walls for isolating the conductor. The base pan assembly also includes a stab element having first and second portions, wherein the first portion is adapted to be connected to the electrical device and the second portion is fastened to the base pan element. The base pan assembly also includes a lug having an opening for receiving the second portion and the conductor.

BRIEF DESCRIPTION OF THE DRAWINGS

FIG. 3 is a perspective view of a base pan.

FIG. 4 depicts an exemplary stab element 44 and lug 46

DESCRIPTION OF THE INVENTION

Figure 1:
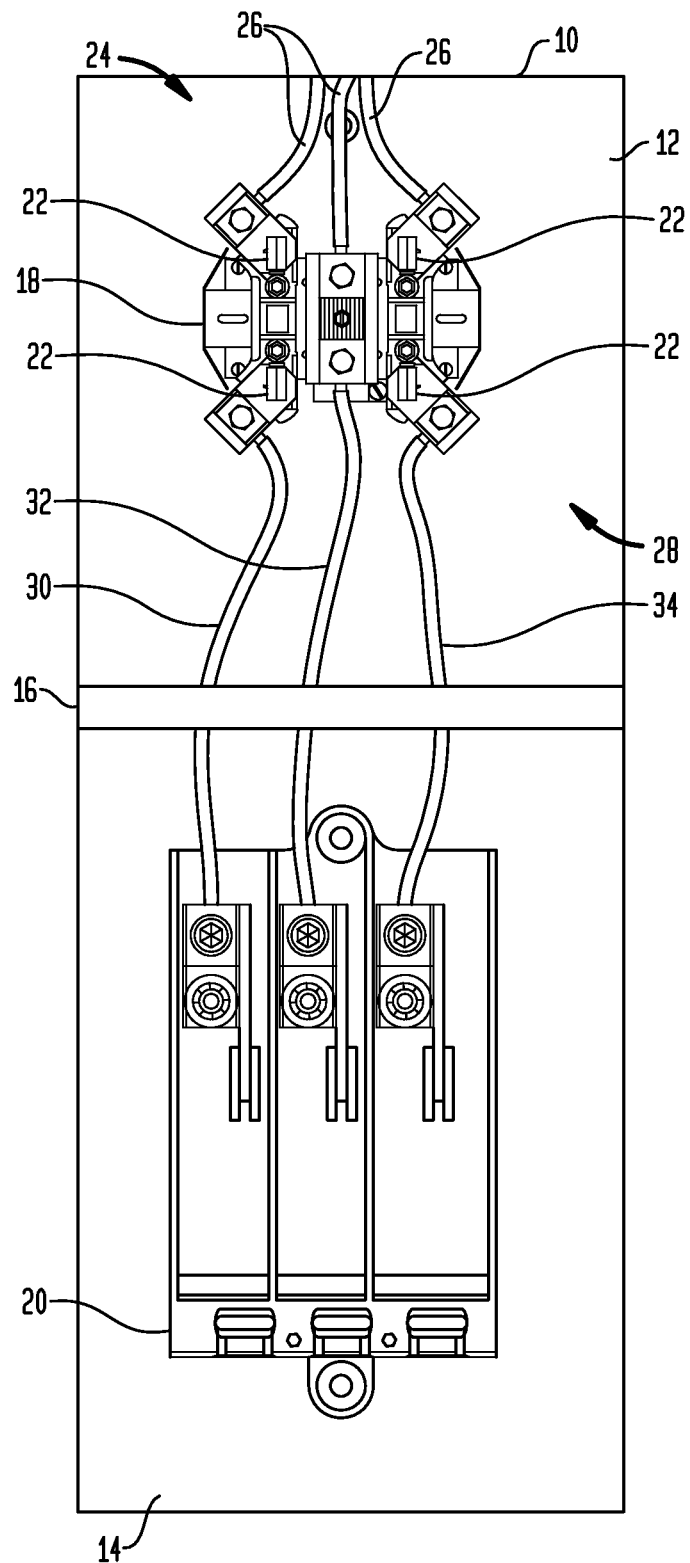
FIG. 1 shows an enclosure including a meter compartment having a meter socket and a base pan compartment having a base pan assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-6.

Referring to FIG. 1, an enclosure 10 including a meter compartment 12 and base pan compartment 14 is shown. The meter 12 and base pan 14 compartments are separated by a barrier 16 and include a meter socket 18 and a base pan assembly 20, respectively. The meter socket 18 includes jaws 22 for receiving outwardly extending stabs from a metering device. The metering device is used to determine how much electricity has been consumed in a building for billing purposes, for example. A line side 24 of the meter socket 18 is connected via conductors 26 to a power distribution system for providing power to a building such as a residence. A load side 28 of the meter socket 18 includes first 30, second 32 and third 34 conductors, such as two live or hot conductors 30,34 and a neutral conductor 32, that extend through the barrier 16 to the base pan assembly 20.

Figure 2:
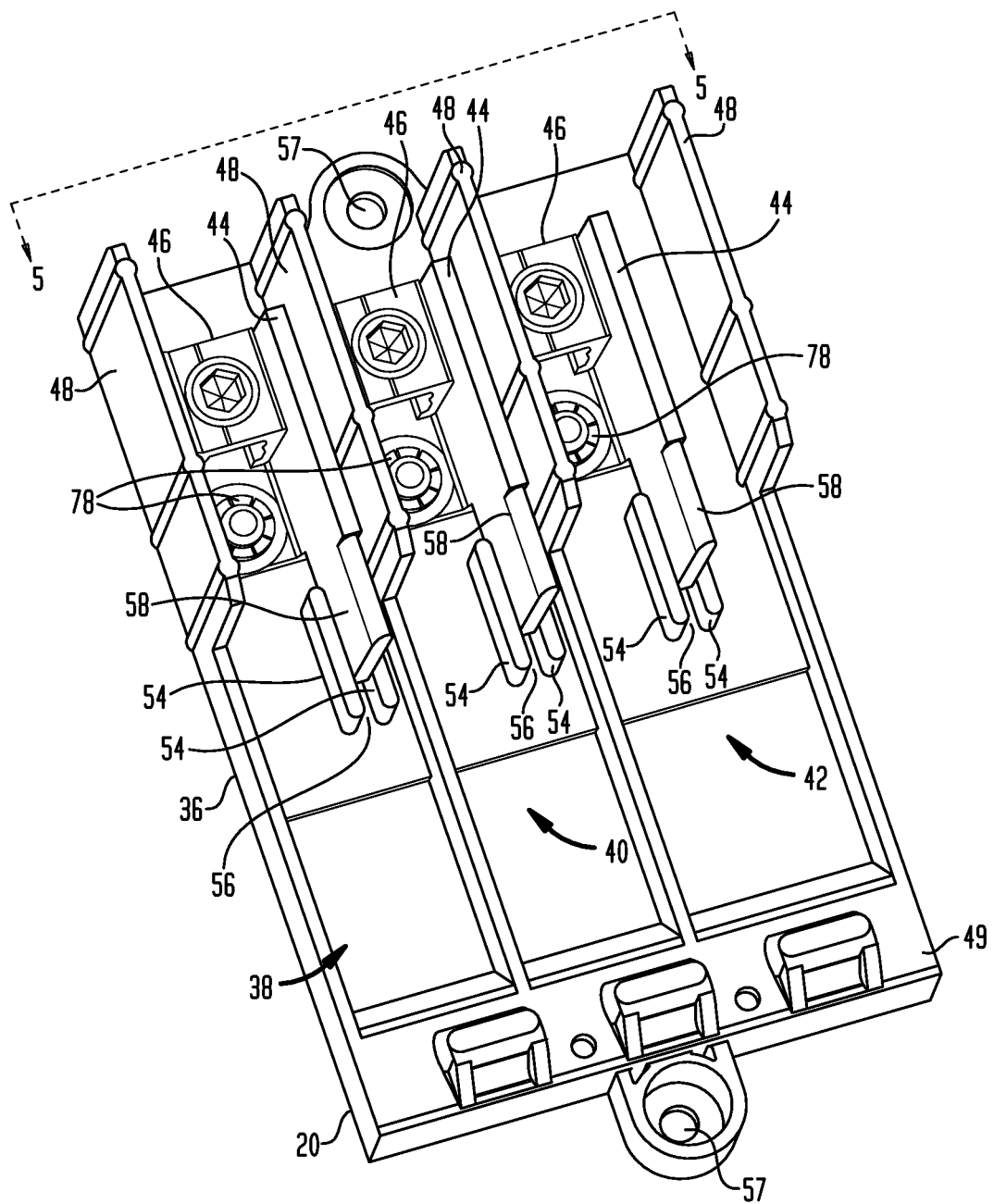
FIG. 2 is a perspective view of the base pan assembly.

Referring to FIG. 2, a perspective view of the base pan assembly 20 is shown. The base pan assembly 20 includes a base pan element 36 having first 38, second 40 and third 42 channels for accommodating a respective conductor 30,32, 34. Alternatively, the base pan element 36 includes only two channels for accommodating configurations wherein only two conductors are utilized. Each channel 38,40,42 includes a stab element 44 and a lug 46 for connecting a respective conductor 30,32,34. Referring to FIG. 3, a perspective view of the base pan 36 is shown. The base pan 36 includes a horizontal mounting portion 49 and vertical upstanding walls 48 which extend from the mounting portion 49. The walls 48 serve to isolate the conductors 30,32,34 and lugs 46. In addition, each channel 38,40,42 includes a recess 50, an upstanding post 52 and a pair of spaced apart ribs 54 forming a slot 56. The base pan 36 also includes mounting holes 57 for receiving a fastener for securing the base pan assembly 20 to the enclosure 10. The base pan 36 may be fabricated from an electrically insulative material such as plastic and may be formed by an injection molding process.

Figure 6:
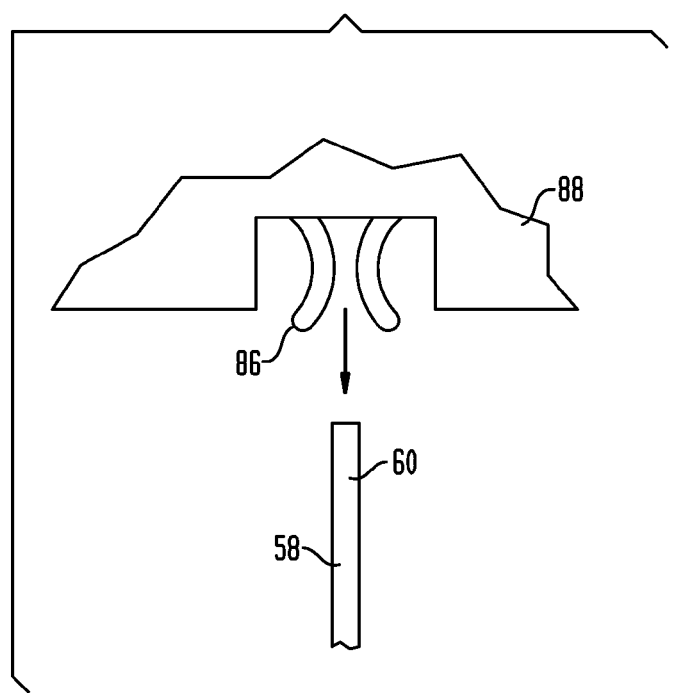
FIG. 6 depicts a vertical stab portion which is received by jaws extending from an electrical device.

Referring to FIG. 4, an exemplary stab element 44 and lug 46 are shown. The stab element 44 includes a vertical stab portion 58 and a horizontal portion 62 to form a substantially L shaped configuration. An upper part 60 of the vertical stab portion 58 is adapted to be received by a pair of spring fingers or jaws 86 extending from an electrical device 88 such as a circuit breaker as shown in FIG. 6. By way of example, the circuit breaker may be a three pole main circuit breaker that serves to connect or disconnect electrical power to the building. The horizontal portion 62 also includes a tongue section 64 and an aperture 66 for receiving the post 52. In one embodiment, the stab element 44 is fabricated from a conductive material such as copper. Alternatively, the stab element 44 may be fabricated from other metals or alloys, such as aluminum.

Figure 5:
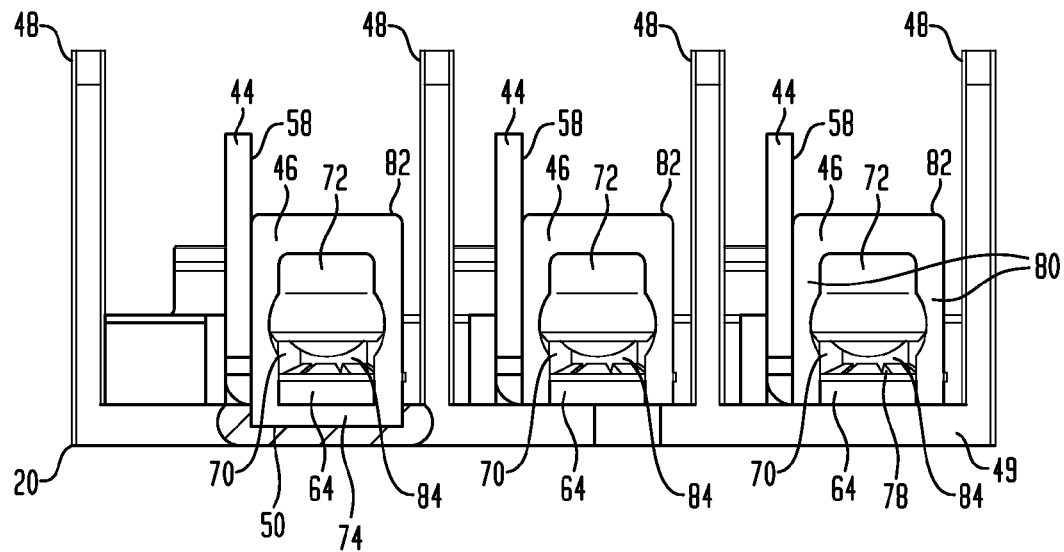
FIG. 5 is view along view line 5-5 of FIG. 2 depicting an end of the base pan assembly.

FIG. 5 is view along view line 5-5 of FIG. 2 depicting an end of the base pan assembly 20. Referring to FIG. 5 in conjunction with FIG. 4, the lug 46 includes spaced apart vertical walls 80 and top 82 and bottom 74 horizontal walls which from a lug opening 70. A wire binding screw 72 is rotatably attached to the top wall 82 and extends through the top wall 82. Upon assembly, the tongue section 64 is inserted (see arrow in FIG. 4) into a lower portion 68 of the lug opening 70 to form a space 84 between the tongue section 64 and the wire binding screw 72 for receiving a conductor 30,32,34. The wire binding screw 72 is then tightened against the conductor to form a conductive path between the conductor, the tongue section 64 and thus the vertical stab portion 58. In addition, the bottom wall 74 of the lug 46 is positioned in the recess 50 and the post 52 is received by the aperture 66.

An end 76 of the vertical stab portion 58 is received by the slot 56 formed by each pair of ribs 54. Each pair of ribs 54 provides additional rigidity to minimize deflection of the vertical stab portion 58 during connection of the vertical stab portion 58 with an electrical device. A lock washer or push nut 78 is positioned on the post 52 which frictionally engages the post 52 to attach and secure the stab element 44 to the base pan 36. Other attachment methods may be used to attach the stab element 44 to the base pan 36 and the post 52 such as using a threaded post 52 and a nut, for example, or other types of fastening arrangements. In addition, fastening methods such as using an adhesive, welding and others may be used. Thus, the base pan assembly 20 provides stabs for enabling secure attachment of a circuit breaker to the enclosure 10. In another embodiment, the meter socket 18 in the base pan assembly 20 may be replaced by any other electrical device that has conductors 30,32,34.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A base pan assembly for connecting to a conductor and an electrical device, comprising:
   a base pan element having walls for isolating the conductor;
   a conductive stab element having first and second portions, wherein the first portion is adapted to be connected to the electrical device and the second portion is fastened to the base pan element; and
   a lug having an opening for receiving the second portion and the conductor.

2. The base pan assembly according to claim 1 further including ribs having a slot for receiving an end of the first portion.

3. The base pan assembly according to claim 1 wherein the second portion is attached to the base pan element by a fastening element.

4. The base pan assembly according to claim 1 wherein the lug includes a fastener for securing the conductor between the fastener and the second portion.

5. The base pan assembly according to claim 1 wherein the electrical device is a circuit breaker.

6. The base pan assembly according to claim 1 wherein the stab element is fabricated from an electrically conductive material such as copper or aluminum.

7. The base pan assembly according to claim 1 wherein the base pan element is fabricated from plastic.

8. A base pan assembly for connecting conductors and an electrical device, comprising:
   a base pan element having walls for isolating each conductor;
   a conductive stab element associated with each conductor, the stab element having first and second portions formed in a substantially L shaped configuration, wherein the first portion is adapted to be connected to the electrical device and the second portion is fastened to the base pan element; and
   a lug associated with each conductor, the lug having an opening for receiving the second portion and the associated conductor.

9. The base pan assembly according to claim 8 further including ribs associated with each stab element, wherein the ribs form a slot for receiving an end of the first portion of the associated stab element.

10. The base pan assembly according to claim 8 wherein the second portion is attached to the base pan element by a fastening element.

11. The base pan assembly according to claim 8 wherein the lug includes a fastener for securing the conductor between the fastener and the second portion.

12. The base pan assembly according to claim 1 wherein the second device is a circuit breaker.

13. The base pan assembly according to claim 1 wherein the stab element is fabricated from an electrically conductive material such as copper or aluminum.

14. The base pan assembly according to claim 1 wherein the base pan element is fabricated from plastic.

15. A base pan assembly for connecting to conductors and an electrical device, comprising:
   a base pan element having a pair of ribs associated with each conductor and watts for isolating each conductor;
   a conductive stab element associated with each conductor, the stab element having first and second portions formed in a substantially L shaped configuration, wherein the first portion is adapted to be connected to the electrical device and the second portion is fastened to the base pan element and wherein an end of the first portion is positioned between a pair of ribs;
   a fastening element associated with each stab element, wherein the fastening element includes a post extending from the base pan element which is received by an aperture in the second portion; and
   a lug associated with each conductor, the lug having an opening for receiving the second portion and the associated conductor.

16. The base pan assembly according to claim 15 wherein the second portion is attached to the base pan element by a push nut frictionally engaged with the post.

17. The base pan assembly according to claim 15 wherein the lug includes a fastener for securing the conductor between the fastener and the second portion.

18. The base pan assembly according to claim 15 wherein the electrical device is a circuit breaker.

19. The base pan assembly according to claim 15 wherein the stab element is fabricated from an electrically conductive material such as copper or aluminum.

20. The base pan assembly according to claim 15 wherein the base pan element is fabricated from plastic.

* * * * *